United States Patent [19]

Hochleitner et al.

[11] Patent Number: 5,347,073

[45] Date of Patent: Sep. 13, 1994

[54] FIXATION OF HEAVY METALS, MERCURY RECOVERY AND DIOXINS DESTRUCTION IN MUNICIPAL SOLID WASTE INCINERATOR ASH

[75] Inventors: Wolfgang A. Hochleitner, Allentown; Stephen P. Goff, Orefield, both of Pa.

[73] Assignee: Air Products and Chemicals, Inc., Allentown, Pa.

[21] Appl. No.: 53,798

[22] Filed: Apr. 28, 1993

[51] Int. Cl.$^5$ .................... B09B 3/00; C04B 18/08
[52] U.S. Cl. ................... 588/256; 106/287.18; 106/DIG. 1; 588/231; 588/251
[58] Field of Search ............ 588/249, 251, 256, 252, 588/257; 106/707, 710, 287.18, DIG. 1

[56] References Cited

U.S. PATENT DOCUMENTS

| | | | |
|---|---|---|---|
| 3,837,872 | 9/1974 | Conner | 106/74 |
| 4,209,335 | 6/1980 | Katayama et al. | 106/645 |
| 4,299,611 | 11/1981 | Penberthy | 65/27 |
| 4,629,509 | 12/1986 | O'Hara et al. | 106/710 |
| 4,737,356 | 4/1988 | O'Hara et al. | 423/659 |
| 4,840,671 | 6/1989 | Lynn et al. | 106/707 |
| 4,877,453 | 10/1989 | Loggers et al. | 106/710 |
| 4,917,733 | 4/1990 | Hansen | 106/710 |
| 4,941,772 | 7/1990 | Roesky et al. | 106/707 |
| 4,971,627 | 11/1990 | Koslowski et al. | 106/DIG. 1 |
| 5,220,112 | 6/1993 | Bucci et al. | 588/256 |

*Primary Examiner*—David H. Corbin
*Attorney, Agent, or Firm*—Robert J. Wolff; William F. Marsh; James C. Simmons

[57] ABSTRACT

Fly ash generated from incineration of municipal solid waste (MSW) when placed in landfills can under mild acid conditions leach lead and cadmium. A process for stabilizing lead in this fly ash is presented which involves calcining a mixture of the fly ash and certain calcium-containing compounds in the presence of an oxygen containing gas stream at a temperature greater than about 475° C. and less than about 600° C. for times from about 30 minutes up to about 5 hours. Such treated MSW fly ash will give leachates containing lead concentrations less than the EPA regulatory limit.

1 Claim, No Drawings

FIXATION OF HEAVY METALS, MERCURY RECOVERY AND DIOXINS DESTRUCTION IN MUNICIPAL SOLID WASTE INCINERATOR ASH

FIELD OF THE INVENTION

The present invention relates to the treatment of heavy metals-containing fly ash in order to (1) prevent or reduce substantially the amount of heavy metals, such as lead and cadmium, which may leach from the ash; (2) recover mercury from the fly ash; (3) destroy dioxins in the fly ash and (4) prevent elemental arsenic and selenium from contaminating the purge stream.

BACKGROUND OF INVENTION

U.S. Pat. No. 5,220,112 by Bucci et al. teaches a thermal treatment process for the stabilization of heavy metals-containing fly ash comprising forming a mixture of the fly ash and a calcium-containing material, heating the mixture to a temperature in the range of from about 475° C. to about 650° C. and maintaining said temperature for a period of time from about 30 minutes to about five hours while in the presence of an oxygen-containing gas to produce a thermally treated fly ash and a purge gas.

There are several problems, however, relating to the temperature range in Bucci as follows:

(1) At temperatures below 400° C., complete mercury recovery of any mercury which may be contained in the fly ash is not possible. Elemental mercury will not volatize below 357° C. and mercury(I) chloride, suspected to form in reactions between mercury and halogen gases, will remain a solid below 400° C. Additionally, dioxins are only partially destroyed at temperatures below 400° C.

(2) At temperatures above 600° C., elemental arsenic and selenium will volatize and subsequently contaminate the purge stream from the thermal treatment process.

It is an object of the present invention to overcome these problems by narrowing the temperature range in Bucci.

BRIEF SUMMARY OF INVENTION

The present invention concerns a thermal treatment process for the stabilization of heavy metals-containing fly ash which process comprises forming a mixture of the fly ash and a calcium-containing material, heating the mixture to a temperature in the range of from about 475° C. to about 650° C. and maintaining said temperature for a period of time from about 30 minutes to about five hours while in the presence of an oxygen-containing gas to produce a thermally treated fly ash and a purge gas. The present invention is an improvement to the above-described process in order to (1) volatize and subsequently recover at least a portion of any mercury which may be contained in the fly ash; (2) destroy any dioxins which may be contained in the fly ash and (3) prevent any elemental arsenic and selenium which may be contained in the fly ash from volatizing and subsequently contaminating the purge gas. The improvement comprises:

(a) narrowing said temperature range from about 475° C.-650° C. to about 475° C.-600° C.;

(b) separating the thermally treated fly ash from the purge gas; and (c) cooling the separated purge gas to a temperature below 357° C. in order to condense out and recover at least a portion of the mercury.

In one embodiment of the present invention, the exit gas from the mercury condenser is recycled back to the flue gas producing combustor or a point upstream from any air pollution control devices. In this embodiment, high mercury recovery in the initial mercury condenser pass is not required.

DETAILED DESCRIPTION OF INVENTION

In this specification the term fly ash will be used to describe the finely divided particulate material that can be separated from a gaseous stream in which it is entrained and which has been subjected to calcium scrubbing. Illustrative of such particulate materials are those obtained from the flue gas from various combustion techniques. Thus, for example, the combustion or incineration of a carbon-, heavy metal-and halogen-containing material, such as refuse material, typically municipal solid waste, produces an ash product and an exit gas stream in which are entrained solid particles. Since halogens, and particularly chlorine, in the form of various halogenated or chlorinated polymers are present in the trash being fed to the incinerator, hydrogen halides, particularly hydrogen chloride, are major products from the incineration of these materials. A sizable amount of the hydrogen halides, especially chlorides, that are formed are swept in the gaseous stream from the incineration zone along with various volatile metal halides, particularly chlorides, of lead and cadmium. It is by this mechanism that a portion of the heavy metals present in the refuse escapes from the incineration section of the incinerator and becomes incorporated into the fly ash product.

This flue gas can then be subjected to treatment for removal of particulate material by several well-known techniques such as by cyclones, filtering, typically using a cloth filter in a "baghouse", or by electrostatic precipitation (ESP).

The active calcium agent required by this invention can be added as a pure component, as a mixture of various active calcium agents, or as a minor component in a mixture of other materials. The active calcium agent can be calcium oxide, calcium hydroxide, or calcium carbonate or mixtures thereof. Broadly, the calcium compound to be added in accordance with this invention can be any thermal precursor of calcium oxide, i.e. a calcium compound that is convertible to calcium oxide at the temperatures employed in the thermal treatment of this invention. The intimate contact of these materials with the heavy metal materials is important so as to promote the reaction of the soluble and volatile heavy metal component with the active agent.

The calcium agents may be pure materials or minor components in a mixture of other materials (active or inactive) and various impurities. Calcium carbonate, for example, can come from various limestones having different levels of hardness, porosity and impurities. Thus, greater or lesser amounts of particular limestones may be required depending upon the concentration of calcium or proportion of calcium to other components in the specific limestone.

Grinding the limestone rock or other calcium-containing material to a size that will provide intimate contact with the heavy metal material will improve the effectiveness of the added agent. Generally, the smaller sizes will promote more intimate contact between the heavy metal compounds and the agent itself.

These agents, when added in an appropriate amount to the ash and subjected to thermal treatment, provide a product of increased stability of heavy metals, particularly lead, wherein the quantity of heavy metals that are leachable under conditions of groundwater exposure will be substantially reduced. The amount of calcium-containing material necessary to effect stabilization is such that the final mixture of fly ash and calcium containing material must have a weight ratio of calcium to fly ash from about 0.04 to about 0.5:1. Generally, it is preferred to maintain a calcium to fly ash ratio of at least about 0.07 gram of calcium per gram of fly ash. Typically, the calcium to fly ash weight ratio will not exceed about 0.4:1.

When engaged in the actual operation of a commercial facility, it may be more convenient to consider the proportion of calcium-containing material to fly ash (as opposed to the proportion of calcium to fly ash pep the above paragraph). In such case, the ratio of calcium-containing material to fly ash is typically at least about 0.06 to about 1.25 gram of calcium-containing material pep gram of fly ash. Generally, the quantity of calcium-containing material will be at least about 0.2 gram of calcium-containing material per gram of fly ash.

In accordance with this invention the mixture of fly ash and the calcium-containing material is placed within a heated zone in the presence of an oxygen containing gas at a temperature which is greater than about 475° C. but less than a temperature of about 600° C. The time the ash is kept at temperature is important, being at least about 30 minutes up to about five hours. It is, of course, desirable to keep the time period short and thermal treating times of less than about three hours and even less than about one hour ape preferred. Again, to those experienced in the apt, additional testing and improved control characteristics can result in reduced stabilization times.

The presence of oxygen duping the thermal treatment is essential for stabilization to occur. We have found that heating in the absence of sufficient oxygen fails to promote the transformations necessary to bind the heavy metals in such a manner to prevent their dissolution into groundwater. The treatment can be conducted in the presence of an oxygen-containing gas which can be air, air enriched with oxygen, or a process gas stream containing sufficient oxygen. The use of heated gasses has the additional advantage of providing both the oxygen and the heat required by this process. It is also believed that higher oxygen partial pressures also promotes faster stabilization at a particular temperature, It has also been found advantageous to effect the thermal treatment of this invention by flowing, preferably under turbulent conditions, the oxygen-containing gas stream over the ash to be treated. It is believed that this movement of the gas results in a better and more intimate contacting of the ash and the oxygen-containing gas, thus resulting in a more efficient thermal treatment and permitting, for example, a lower temperature than would be required under more quiescent conditions. In addition to decreased temperatures, more turbulent conditions may with increased testing and improved control characteristics result in decreased treatment times as well.

The process of this invention can be conducted in a batch or continuous manner.

A common problem that occurs in handling solids of the small size typical of fly ash materials is their propensity to form dust and become airborne within the surrounding air. Often water or dust inhibitors have to be added to keep down the dust that forms when handling these materials, especially in transferring these solids between containers or into vehicles for transport. A unique benefit of the thermal treatment process as disclosed herein is that the average particle size of the thermally treated material increases making the material considerably less dusty.

We claim:

1. In a process for the stabilization of heavy metals-containing fly ash obtained by subjecting flue gas to particulate separation, which process comprises forming a mixture of the fly ash and a calcium-containing material, said calcium-containing material being present in the mixture so as to provide a weight ratio of calcium to fly ash from about 0.04 to about 0.5:1, heating the mixture to a temperature in the range of from about 475° C. to about 650° C. and maintaining said temperature for a period of time from about 30 minutes to about five hours while in the presence of an oxygen-containing gas to produce a thermally treated fly ash and a purge gas, the improvement for (1) volatilizing and subsequently recovering any mercury which may be contained in the fly ash; (2) destroying any dioxins which may be contained in the fly ash and (3) preventing any elemental arsenic and selenium which may be contained in the fly ash from volatilizing and subsequently contaminating the purge gas comprising:

(a) narrowing said temperature range from about 475° C.–650° C. to about 475° C.–600° C.;

(b) separating the thermally treated fly ash from the purge gas; and (c) cooling the separated purge gas to a temperature below 357° C. in order to condense out and recover at least a portion of the mercury.

* * * * *